(12) United States Patent
Maffeis

(10) Patent No.: US 8,256,961 B2
(45) Date of Patent: Sep. 4, 2012

(54) PRE-LOADED ADJUSTABLE BALL BEARING GUIDE SYSTEM

(75) Inventor: Giuseppe Maffeis, Castelmella (IT)

(73) Assignee: Gimatic S.p.A., Roncadelle (Brescia) (IT)

( * ) Notice: Subject to any disclaimer, the term of this patent is extended or adjusted under 35 U.S.C. 154(b) by 148 days.

(21) Appl. No.: 12/730,439

(22) Filed: Mar. 24, 2010

(65) Prior Publication Data

US 2010/0247006 A1 Sep. 30, 2010

(30) Foreign Application Priority Data

Mar. 25, 2009 (IT) .................... BS 2009 A 000059

(51) Int. Cl.
*F16C 29/04* (2006.01)
(52) U.S. Cl. .......................................... 384/49
(58) Field of Classification Search ............ 384/49, 384/57; 92/88, 165 R; 74/89.23, 89.32, 74/89.33
See application file for complete search history.

(56) References Cited

U.S. PATENT DOCUMENTS

| 2,595,482 | A | * | 5/1952 | Palumbo | 384/49 |
| 3,022,122 | A | * | 2/1962 | Pfister | 384/49 |
| 3,024,073 | A | * | 3/1962 | Krueger | 384/49 |
| 6,174,086 | B1 | * | 1/2001 | Ng et al. | 384/45 |
| 6,672,765 | B2 | * | 1/2004 | Nagai et al. | 384/49 |

* cited by examiner

*Primary Examiner* — Thomas R Hannon
*Assistant Examiner* — Adam D Rogers
(74) *Attorney, Agent, or Firm* — McGlew and Tuttle, P.C.

(57) ABSTRACT

The invention concerns a guide system with rolling elements, in particular ball bearings, for slide devices having a first and a second slide members (11, 12) coupled and guided between them, where a slide member (12) is susceptible to alternative linear movements compared with the other slide member (11) with the interposition of two linear sets of ball bearings (31, 31'). One of said slide members (12), on at least one of its sides parallel with the movement direction, has an opening which is integrated by a variable clamping finishing cheek (28) to establish an adjustable preload of the two sets of ball bearings between the first and the second slide members.

14 Claims, 2 Drawing Sheets

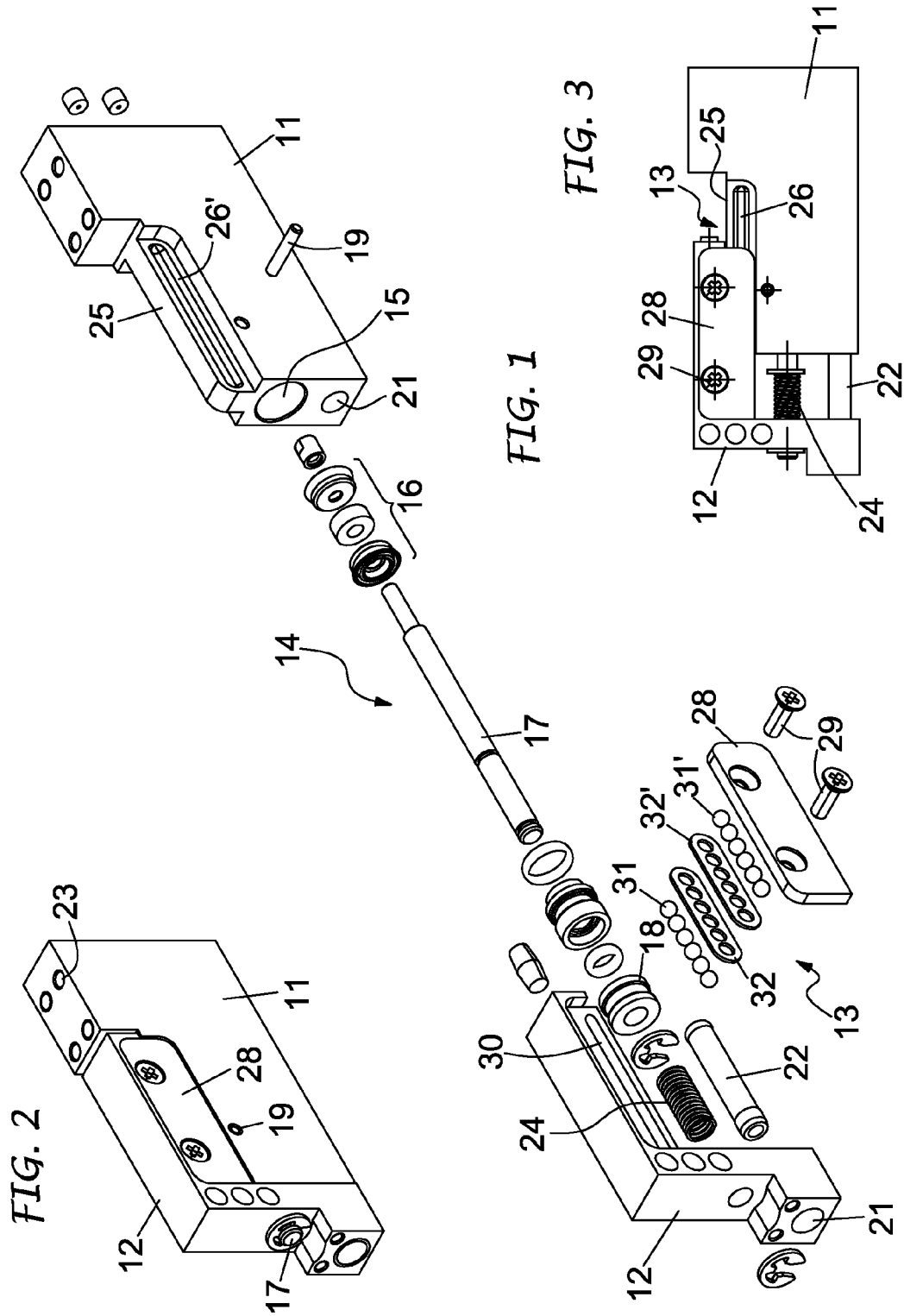

PRE-LOADED ADJUSTABLE BALL BEARING GUIDE SYSTEM

FIELD OF THE INVENTION

This invention concerns in general to sliding devices, having two coupled elements and guided between them, by an element susceptible to alternating linear movements compared to the other caused by a control unit which is preferably pneumatic. In particular the invention is directed by a guide system with rolling elements, in general ball bearings, for said sliding devices, especially if small sized.

STATE OF THE TECHNIQUE

The sliding devices taken into consideration herein can be pneumatically controlled type and are largely used in numerous sectors, in particular, but not only, for automatic gripping and manipulation operations of various components and elements requiring positioning and assembling. The can also be equipped with a prehensile device, such as a suction cup, controlled pneumatically by means of a duct that extends in the two sliding parts.

According to the known technique, the two parts of the sliding device can be coupled and slide one compared to the other with the interposition of rolling elements, mostly ball bearings. The presence of these elements facilitates the sliding even when the pneumatic control pressure is minimum, but their assembly however requires high precision operations and consequently time and considerable implementation costs, furthermore without the possibility of adjusting the preload of the coupling.

For some applications, then, it is also important for these slide members to be small in size and light in weight, conditions which are not possible to be follow with the guide and assembly techniques at present adopted in this sector.

OBJECTIVE AND SUMMARY OF THE INVENTION

Therefore, one objective of this invention is to propose a guide system for a slide device of the aforementioned configured type, to simplify both the structure and the assembly method, to eliminate the necessity for precision work, to make possible the external adjustment of the preload of the guide means, to ensure the correct performance and to reduce the overall dimensions of the device, in particular its width, which is to be considered as the thickness measured on the narrowest sides of the slide that extend in the direction of the movement of the mobile element.

Said objective and implicit advantages deriving from it are achieved, according to the invention in a guide system for slide devices of the pneumatic control type according to the preamble in claim 1 and where one of the slide elements, on at least one of its parallel sides in the movement direction, has an opening and is integrated with the hard-facing and fixing in said opening of a finishing cheek, the tightening of which is variable to establish an adjustable preload of the two lines of ball bearings between the two coupled slide elements.

Consequently and favourably, as a whole said inserted finishing cheek has the prerogative of facilitating the assembly of the slide, of completing the structure of the latter, integrating with the relative fixing means, to allow a fine adjustment from the outside of the preload of the coupling of the guide system.

BRIEF DESCRIPTION OF THE DRAWINGS

The invention will however be better illustrated in the continuation of the present description made in reference to the enclosed exemplicative, but not limiting drawings, in which:

FIG. 1 shows a blown-up view of the components of a slide device with a guide system according to the invention;
FIG. 2 shows a view of the assembled slide device;
FIG. 3 shows a side view of the device.

DETAILED DESCRIPTION OF THE INVENTION

Figures 4, 5:
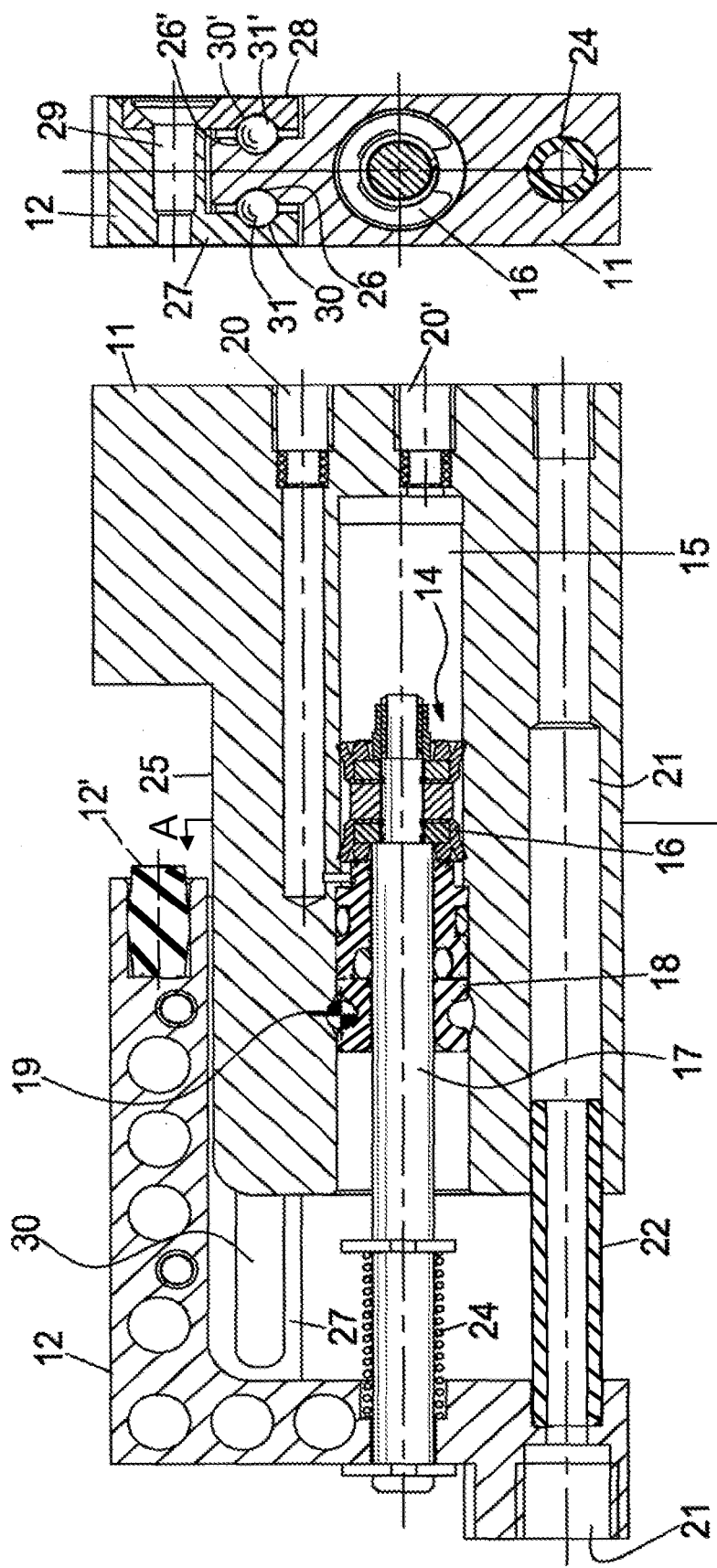
FIG. 4 shows an enlarged longitudinal section.
FIG. 5 shows a cross section according to arrows A-A in FIG. 4 and with the guide system underlined.

In said drawings is indicatively represented a slide device that comprises a first fixed element or member 11 and a second slide member 12 complementally coupled and guided one with the other by the guide system 13 of the invention.

The slide member 12 is susceptable to alternating linear movements compared to the fixed slide member 11, movements carried out by means of a pneumatic control unit 14. This control unit consists in a fluid chamber 15 provided in the fixed slide element 11 by its length, and in a piston 16 housed and sealed and sliding in said chamber and equipped with a rod 17, that crosses at least one guide ring 18 held in said chamber 15 by a pin 19 and which extends until it connects up to the slide member 12. The chamber 15 is fed by a fluid under pressure, especially air, alternating through adduction/discharge ducts 20, 20' so as to cause the above movements of the mobile slide element compared with the fixed one.

The slide member 12 can also be equipped, although not shown, with a prehensile member, such as a suction cup, positioned in line with a fluid duct 21 parallel with the chamber 15 for the piston 16, crossing longitudinally the two slide elements and connectable, on the side of the fixed slide element 11, to a vacuum group—non shown—designed to control the action of the a prehensile member. To give continuity to said duct also during the movements of the mobile element compared with the fixed one, a tube 22 is placed between the two slide element, which couples telescopically with one of said elements, in the drawings, the fixed slide element 11.

This slide element 11 is equipped with means 23 for its application, for example, to a manipulator. Along the rod 17 of the piston 16 is placed a spring 24 designed to push the slide member 12 towards the item to be picked up, protecting in this way from time to time the adherence of the prehensile member to the item. A shock absorber 12' is positioned between the two facing parts of the two slide elements.

The guide system 13 proposed in the example shown comprises a guide rib 25 integral with the fixed slide element 11, extending along at least a part of the length of the latter and having two linear tracks 26, 26' along is opposite sides.

As regards to the slide member 12 it has a wall 27 that runs along an adjacent side of the guide rib 25 of the fixed element on a side parallel to the movement direction. On the opposite side the slide member 12 has an opening and becomes integrated with the hard-facing in said opening of a finishing cheek 28 running along the opposite side of said guide rib 25. Said finishing cheek is fixed to the slide member 12 by means of screws 29.

On the internal face of the lateral wall 27 of the fixed slide element 11 is provided with a linear track 30 opposite to the facing linear track 26 on the adjacent side of the guide rib 25 of the mobile element; the same applies to the internal face of the inserted finishing cheek 28 where a linear track 30' is provided opposite to the facing linear track 26' on the other side of the rib of said guide 25.

Between the lateral wall 27 of the mobile slide element and the adjacent side of the guide rib 25 of the fixed slide element 11 is positioned a first linear row of rolling elements, in particular ball bearings 31, that are spaced out by a relative ball holder cage 32 and led between the two facing tracks 26, 30 on that side of the slide. Analogously, between the finishing cheek 28 and the other adjacent side of the guide rib 25 of the fixed slide element is positioned a second linear line of ball bearings 31, also spaced out by a relative ball holder cage 32' and led between the two facing tracks 26', 30' on the other side of the slide.

Thanks to the configuration described above, the two lines of ball bearings 31, 31' can be associated with the fixed and mobile elements 11, 12 of the slide before the fixing of the finishing cheek 28 to the mobile slide. Assembly in this way becomes simple and easy to carry out and, however, once done it will be possible to vary the preload of the coupling between the two elements with the two interposed lines of ball bearings, by simply tightening/loosening the fixing screws 29 of the finishing cheek 28 and by this adjusting the smoothness of the mobile element compared with that of the fixed one according to requirements.

What is claimed is:

1. A guide system for slide devices having a first slide element and a second slide element coupled and guided with one another, said second slide element having an opening, wherein said first slide element is susceptible to reciprocating linear movements with respect to said second slide element with the interposition of two linear sets of rolling elements, the guide system comprising:
    a guide rib integrally connected to said first slide element, said guide rib extending along at least a portion of a length of said first slide element, said guide rib comprising a first guide rib side and a second guide rib side, said second guide rib side being opposite said first guide rib side, said guide rib comprising a linear track on each of said first guide rib side and said second guide rib side;
    a side wall integrally connected to said second slide element, said side wall extending along said first guide rib side, said side wall comprising a side wall linear track, said side wall linear track being opposite said linear track on said first guide rib side;
    a finishing cheek attached at said opening of the second slide element at a side opposite said side wall, said finishing cheek extending along said second guide rib side, said finishing cheek comprising a finishing cheek linear track, said finishing cheek linear track being opposite said linear track on said second guide rib side, wherein said two linear sets of rolling elements comprises a first linear set of rolling elements provided between said side wall linear track and said linear track on said first guide rib side, and a second linear set of rolling elements provided between said linear track on said second guide rib side and said finishing cheek linear track.

2. The guide system according to claim 1, wherein said finishing cheek is fixed to the second slide element via adjustable clamping screws to set a variable preloading on said first linear set of rolling elements and said second linear set order of rolling elements between said first slide element and said second slide element.

3. The guide system according to claim 1, wherein the side wall and the finishing cheek of the second slide member are parallel to each other, arranged on opposite sides of the guide rib of the first slide member and provided with said first linear set of rolling elements and said second linear set of rolling elements.

4. The guide system according to claim 1, wherein said finishing cheek is fixed to the second slide member by means of adjustable clamping screws.

5. The guide system according to claim 1, wherein said first slide element is connected to one end of a piston and said second slide member is connected to another end of the piston, said second slide element reciprocating in a linear direction between a first position and a second position, with respect to said first slide element, via said piston, said second slide element being located at a first distance from said first slide element in said first position, said second slide element being located at a second distance from said first slide element in said second position, said second distance being greater than said first distance.

6. A pneumatically controlled slide comprising:
    a guide system with a first set of linear rolling elements and a second set of linear rolling elements, for slide devices having a first slide member and a second slide member coupled with one another said first slide member comprising an opening, wherein one of said first slide member and said second slide member is susceptible to reciprocating linear movements with respect to another one of said first slide member and said second slide member with the interposition of said first set of linear rolling elements and said second set of linear rolling elements, said guide system further comprising a guide rib, a side wall and a finishing cheek, said guide rib being integrally connected to said first slide member, said guide rib extending along at least a portion of a length of said first slide member, said guide rib comprising a first guide rib side and a second guide rib side, said first guide rib side being opposite said second guide rib side, said guide rib comprising a first guide rib linear track extending along said first rib guide side and a second guide rib linear track extending along said second rib guide side, said side wall being integrally connected to said second slide member, said side wall extending along said first guide rib side, said side wall comprising a side wall linear track, said side wall linear track being opposite said first guide rib linear track on said first guide rib side, said finishing cheek being attached at said opening at a side opposite said side wall, said finishing cheek extending along said second guide rib linear track on said second guide rib side, said finishing cheek comprising a finishing cheek linear track, said finishing cheek linear track being opposite said second guide rib linear track, said first linear set of rolling elements being arranged between said side wall linear track and said first guide rib linear track, said second set of linear rolling elements being arranged between said finishing cheek linear track and said second guide rib linear track.

7. The pneumatically controlled slide according to claim 6, wherein said finishing cheek is fixed to the second slide member via adjustable clamping screws to set a variable preloading on said first set of rolling elements and said second set of linear rolling elements between said first slide member and said second slide member.

8. The pneumatically controlled slide according to claim 6, wherein the side wall and the finishing cheek of the second slide member are parallel to each other, arranged on opposite sides of the guide rib of the first slide member and provided with said first linear set of rolling elements and said second linear set of rolling elements.

9. The pneumatically controlled slide according to claim 6, wherein said first slide member is connected to one end of a piston and said second slide member is connected to another end of the piston, said second slide member reciprocating in a linear direction between a first position and a second position, with respect to said first sliding member, via said piston, said second slide member being located at a first distance from said first slide member in said first position, said second slide member being located at a second distance from said first slide member in said second position, said second distance being greater than said first distance.

10. A pneumatically controlled slide, comprising:
   a first slide element comprising an outer first slide element surface, said outer first slide element surface defining a guide rib with a first guide rib linear groove and a second guide rib linear groove, said first guide rib linear groove being opposite said second guide rib linear groove, said guide rib being integrally connected to said first slide element, said guide rib extending in an axial direction of said first slide element, said guide rib having a first guide rib side and a second guide rib side, said first guide rib linear groove being located on said first guide rib side, said second guide rib linear groove being located on said second guide rib side;
   a second slide element comprising a side wall on a first side thereof and an opening on a second side thereof, said first side being opposite said second side, said side wall being integrally connected to said second slide element, at least a portion of said side wall extending along at least a portion of said first guide rib side, said side wall comprising a side wall linear groove, said side wall linear groove and said first guide rib linear groove defining a first rolling element space, at least a portion of said side wall linear groove being opposite said first guide rib linear groove;
   a plate connected to said second slide element, said plate closing said opening, said plate and said side wall defining a guide rib receiving opening, at least a portion of said guide rib being arranged in said guide rib receiving opening, at least a portion of said plate extending along said second guide rib side, said plate having a plate linear groove defined on an inner side thereof, said plate linear groove and said second guide rib linear groove defining a second rolling element space, at least a portion of said plate linear groove being opposite at least a portion of said second guide rib linear groove;
   a first plurality of rolling elements arranged in said first rolling element space;
   a second plurality of rolling elements arranged in said second rolling element space.

11. The pneumatically controlled slide according to claim 10, further comprising:
   a piston, wherein said first slide element is connected to one end of said piston and said second slide element is connected to another end of said piston, said second slide element reciprocating in a linear direction between a first position and a second position, with respect to said first slide element, via said piston, said second slide element being located at a first distance from said first slide element in said first position, said second slide element being located at a second distance from said first sliding element in said second position, said second distance being greater than said first distance.

12. The pneumatically controlled slide according to claim 10, wherein said plate is fixed to the second slide element via adjustable clamping screws to set a variable preloading on said first plurality of rolling elements and said second plurality of rolling elements.

13. The pneumatically controlled slide according to claim 10, wherein the side wall and the plate are parallel to each other.

14. The pneumatically controlled slide according to claim 10, wherein one or more of said first plurality of rolling elements engage one or more of said side wall and said guide rib, one or more of said second plurality of rolling elements engaging one or more of said plate and said guide rib.

* * * * *